United States Patent [19]
Barua et al.

[11] 4,098,987
[45] Jul. 4, 1978

[54] NON-IONIC SURFACTANTS FROM WATER SOLUBLE COPOLYMERS OF ACRYLAMIDE WITH HYDROPHOBIC MONOMERS

[75] Inventors: Girish Chandra Barua; Daniel Elmer Nagy, both of Stamford, Conn.

[73] Assignee: American Cyanamid Company, Stamford, Conn.

[21] Appl. No.: 705,315

[22] Filed: Jul. 14, 1976

[51] Int. Cl.$^2$ ............................................. C08F 220/56
[52] U.S. Cl. ................................. 526/304; 260/29.6 R; 526/303
[58] Field of Search ............................... 526/303, 304; 260/29.6 R

[56] References Cited

U.S. PATENT DOCUMENTS

| 2,486,191 | 10/1949 | Minsk et al. | 526/303 |
| 2,831,841 | 4/1958 | Jones | 526/303 |
| 2,978,432 | 4/1961 | Graulich et al. | 526/303 |
| 3,117,108 | 1/1964 | Calvete | 526/304 |
| 3,753,958 | 8/1973 | Wingler et al. | 526/303 |
| 3,925,287 | 12/1975 | Andersen | 526/304 |

Primary Examiner—Harry Wong, Jr.
Attorney, Agent, or Firm—Gordon L. Hart

[57] ABSTRACT

Polymeric surfactants are copolymers of acrylamide with 30 – 60 wt. percent of acrylic esters or alkyl or alkoxymethyl acrylamides having molecular wt. from 800 to 10,000 amu.

7 Claims, No Drawings

NON-IONIC SURFACTANTS FROM WATER SOLUBLE COPOLYMERS OF ACRYLAMIDE WITH HYDROPHOBIC MONOMERS

The invention relates to water-soluble polymers having surface active properties. These polymers are prepared by copolymerizing acrylamide monomer with at least 30 percent of at least one other vinyl addition monomer such as the N-alkylacrylamides, e.g. N-t-butylacrylamide, the N-alkoxymethylacrylamides, e.g. N-isobutoxymethylacrylamide, the alkyl ($C_1$–$C_8$) esters of acrylic and methacrylic acids, styrene and the like, to make copolymers in the molecular weight range from about 800 to about 10,000. These new copolymers are found to be soluble in water and they are found to have non-ionic surface active properties when dispersed in aqueous solution. These properties make the copolymers useful as non-ionic surfactants for a variety of uses.

Some of the monomers that are copolymerized with acrylamide for making the novel copolymers are hydrophobic in nature as compared with the hydrophilic nature of acrylamide and this hydrophobic property would lead one to expect that acrylamide copolymers having more than about 15–20 percent by weight of the copolymerized hydrophobic monomer units would not be water-soluble. Now we have prepared water-soluble acrylamide copolymers which contain from about 20 percent up to about 60 percent by weight of copolymeried hydrophobic monomer units in the polymer product. These water-soluble copolymers range in average molecular weight from about 800 to about 10,000. The copolymers are readily dispersible in water at concentrations up to about 50 wt. percent of polymer in the solution.

The water dispersible copolymers of the invention are prepared by conventional polymerization techniques. The molecular weight of the product is controlled by known techniques, e.g. varying the amount of the polymerization initiator and selecting a method of addition of reagents to yield a polymer product of the desired molecular weight. The selected mixture of monomers is dispersed in a aqueous solution, which may contain a cosolvent for dispersing the hydrophobic monomers. Isopropyl alcohol is a most preferred cosolvent for this use, but other cosolvents such as other $C_1$ to $C_4$ alcohols, i.e. ethanol, isobutanol and the like might be used instead. A initiator for the vinyl-addition polymerization is used in catalytic amount. We prefer to use the known sulfite-persulfate initiator catalyst but other suitable catalysts for this reaction may be used, such as the organic peroxide and azo initiators.

When the catalyst is added to the monomer solution, the monomers begin to react at about 60° C. and the exothermic reaction causes a rapid rise in the temperature of the reaction mixture. The temperature is held at the reflux temperature of the cosolvent mixture, about 83° C. by applying heat after the exotherm is no longer sufficient to sustain reflux. As the reaction proceeds, the pH of the reaction mixture tends to decline but is held in the range from pH4 to pH5 by addition of alkali or other suitable base as needed. The end of the reaction is indicated when the pH remains steady. The reaction may also be carried out with the addition of reactants during the course of the reaction for control of the exotherm to eliminate the need for cooling apparatus.

EXAMPLE 1

A 2 liter, 4-neck flask is equipped with stirrer, reflux condenser, thermometer, single-probe pH electrode and a cooling bath. In the flask a solution of 80 g. isobutoxymethacrylamide and 120 g. acrylamide in 400 ml isopropyl alcohol and 246 ml water is heated to 60° C. and 2 g. sodium metabisulfite in 30 ml water and 4 g. ammonium persulfate in 30 ml water are added. The exotherm is controlled with cooling and by reflux as the temperature reaches 85° C. As the reaction proceeds at this temperature the pH is maintained in the range from 4.0 to 5.0 by addition of 10 percent NaOH aqueous solution. In about 10 minutes the reflux stops and temperature is kept at about 80°–83° C. with heating as needed until the reaction is completed, about 1 to 2 hours. When the ph remains steady, the reaction is over. The pH is then adjusted to pH6.3 and the product solution is concentrated by evaporation under vacuum to about 442 g. of solution containing about 45.3 percent polymer solids. Molecular weight of the polymer is about 4,000 amu and the surface active property is measured by making a 1.0 percent aqueous solution of the polymer and measuring the surface tension of the solution. In this example the surface tension is 33 dynes/cm. Copolymers containing from 20 to 60 parts by wt. of isobutoxymethylacrylamide with acrylamide to make 100 parts have been prepared and show surface active properties.

EXAMPLE 2

A solution of 40 g. isobutoxymethylacrylamide (IBMA) and 120 g. of 50 percent aqueous acrylamide (AMD) in 500 ml of isopropyl alcohol and 260 ml of water is heated to 60° C. Sodium bicarbonate 1.6 g. in 15 ml of water is added, followed by addition of solutions of ammonium persulfate and sodium metabisulfite (2.0 g. in 15 ml of water, each). The reaction mixture is then heated to reflux temperature (83° C.) for 30 minutes. After cooling to 70° C., a second portion of the same amount of the same monomers and sodium bicarbonate are added as before followed by the same amount of the same initiators as before. The mixture is again heated at reflux temperature for 30 minutes and cooled to 70° C. The procedure is repeated two more times to make a total of 160 g. IBMA and 480 g. 50 percent AMD added to the reaction mixture. Removal of the isopropyl alcohol under reduced pressure produces a 40 percent solution of the product. The polymer obtained has an average molecular weight of 1700 amu and produces surface tension of 34 dynes/cm in a 1 percent aqueous solution.

EXAMPLE 3

By the same procedure described in Example 1, 70 g. butyl acrylate and 130 g. acrylamide are copolymerized and the product solution is condensed to make 503 g. of product containing 39.7 percent of the active polymer solids. When the polymer is dissolved in water to make a 0.1 percent solution the surface tension is 31 dynes/cm. Other copolymers of acrylamide with from 25 to 40 percent butylacrylate have similar surface active properties in aqueous solution.

EXAMPLE 4

By the same procedure described in Example 1, 70 g. of tertiary octyl acrylamide and 130 g. acrylamide are copolymerized using 4 g. ammonium persulate, making a product solution of 43 percent polymer. The material has critical micelle concentration (CMC) of 0.022 percent and a 0.1 percent aqueous solution has surface tension of 32.5 dynes/cm. Other copolymers of acrylamide containing 20 to 35 percent t-octyl acrylamide, prepared by this method have surface activity in aqueous solutions.

EXAMPLE 5

The apparatus is a four neck flask the same as in Example 1, but it is equipped for addition of reactants and catalyst in increments as the reaction proceeds. Before beginning, 60 g. isobutoxymethylacrylamide and 40 g. acrylamide are dissolved in 30 ml isopropanol and 30 ml water and placed in one addition funnel attached for addition in increments to the reactor. Three syringes are filled respectively with 2 g. sodium metabisulfite in 26 ml water, 3.0 g. ammonium persulfate in 25 ml water, and a 10 percent sodium hyroxide aqueous solution and means is provided for addition to the reactor from each syringe. To begin, the reactor is charged with 170 ml isopropanol and 90 ml water heated to 80° C. Additions are then made steadily from the addition funnel and the two catalyst syringes over a period of 12 minutes as needed to maintain the reaction temperature at 80° C. with cooling. At intervals during the addition, amounts left in each of the funnel and the two catalyst syringes are as follows:

| Reactants in the Addition Funnel | Metabisulfite | Persulfate |
|---|---|---|
| 180 ml | 28 ml | 28 ml |
| 150 ml | 29 ml | 24 ml |
| 125 ml | 20 ml | 20 ml |
| 100 ml | 16 ml | 16 ml |
| 50 ml | 11 ml | 11 ml |
| 0 ml | 9 ml | 9 ml |
| 0 ml | 0 ml | 6 ml |

Throughout the additions, and thereafter during the reaction, the pH is maintained in the range from pH4 to pH5 by addition from the alkali syringe as needed. A total of 9.5 ml of the 10 percent NaOH solution is used. The temperature is held at 80° to 82° C. for about 75 minutes, after all of the monomer reactants are in, until the reaction is complete as indicated by no further change of the pH. Then the pH is adjusted to pH6.0 and the solvents are evaporated in vacuum to make a liquid product containing 47.3 percent active solids. A 1 percent aqueous solution of this polymer has surface tension of 31.5 dynes per cm.

EXAMPLE 6

By a process about the same as that described in Example 5, 35 g. methylmethacrylate and 65 g. acrylamide are copolymerized and the product is condensed to make a 36.6 percent active solids solution. A 1.0 percent aqueous solution of this polymer has surface tension of 44 dynes/cm.

EXAMPLE 7

By the process described in Example 1 a copolymer of acrylamide with tertiary butylacrylamide 40 percent is prepared and a 1.0 percent aqueous solution has surface tension of 37 dynes/cm. Other soluble copolymers of acrylamide with 35 to 60 percent t-butylacrylamide also exhibit surface active properties.

EXAMPLE 8

By the same method described in Example 1 a copolymer of acrylamide with 40 percent ethyl acrylate is made. This polymer has surface tension of 35 dynes/cm in 1.0 percent aqueous solution.

EXAMPLE 9

A 1 liter flask is equipped with stirrer, reflux condenser, thermometer, and 2 inlets from a tubing pump. In the flask a solution of 40 g. water and 40 g. isopropanol is heated to reflux. Separate solutions of monomer (40 g. isobutoxymethacrylamide, 120 g. 50 percent aqueous acrylamide, 50 g. isopropanol) and initiator (sodium salt of 1.7 g. 4,4'-Azobis(4-cyanovaleric acid) in 15 ml of water) are pumped into the reaction flask over a 2 hr. period. The reaction is heted at reflux temperature for an additional 1.5 hr. and the pH is adjusted to 6.1 with 1 N hydrochloric acid. Removal of the isopropanol under reduced pressure leaves a 50 percent solution of the product. A 1.0 percent aqueous solution of the product has a surfce tension of 37 dynes per cm.

The average molecular weight (amu) of each polymer and the surface tension of aqueous solutions, as measured in each example above, are tabulated in Table 1.

Table 1

| Example | Comonomer (Wt. %) | Surface Tension dynes/cm | Average Mol. Wt. amu |
|---|---|---|---|
| 1 | isobutoxymethylacrylamide (40%) | 33 | 4000 |
| 2 | isobutoxymethylacrylamide (40%) | 34 | 1700 |
| 3 | butyl acrylate (35%) | 31 | 3000–6000 |
| 4 | t-octyl acrylamide (35%) | 32.5 | 3000–6000 |
| 5 | isobutoxymethylacrylamide (60%) | 31.5 | 3000–6000 |
| 6 | methyl methacrylate (35%) | 44 | 3000–6000 |
| 7 | t-butyl acrylamide (40%) | 37 | 6000 |
| 8 | ethyl acrylate (40%) | 35 | 3000–6000 |
| 9 | isobutoxymethylacrylamide (40%) | 37 | 4500 |

The surface active properties exhibited by the copolymers made in the foregoing examples would not have been expected from consideration of the molecular structure of those polymers. These polymers do not have the characteristic long chain aliphatic terminal groups that are typical of most surface active agents. The relatively shorter alkyl groups on the comonomers that are polymerized with acrylamide in the present compolymers would not suggest the surface active property of the polymers.

The polymeric surfactants of the invention are found to have utility in a variety of the uses that are known for nonionic surfactants. One such use of the novel surfactants is their use as dispersing agents in aqueous monomer dispersions. These are the reaction mixtures for emulsion polymerization of the dispersed monomers to make polymer latices. The surfactants are useful for making copolymers of acrylate and methacrylate monomers, copolymers of vinyl acetate with acrylate esters or methacrylate esters, and other similar polymer latices. A variety of excellent to acceptable latex emulsions of the kind described have been prepared using several of the polymeric surfactants which have been prepared as described in the examples above. In such monomer dispersions, the polymeric surfactants are used at concentrations from about 1.5 to about 4 percent, based on the weight of monomers in the aqueous dispersion about to be polymerized. The polymer latices obtained upon the polymerization of these monomer dispersions compare favorably with latices which are obtained using known surfactants of choice as the dispersants.

We claim:

1. A water-soluble polymer consisting of copolymerized monomers consisting of 40 to 70 percent by weight acrylamide and 30 to 60 percent by weight of at least one monomer selected from the group consisting of styrene, lower alkyl esters of acrylic acid, lower alkyl esters of methacrylic acid, and the alkyl and alkoxymethyl acrylamides in which alkyl contains 4 to 13 carbon atoms, said polymer having non-ionic surface active properties in aqueous solution.

2. A water-soluble polymer defined by claim 1 wherein the copolymerized monomers consist of 60 percent by weight acrylamide and 40 percent by weight isobutoxymethyl acrylamide.

3. A water-soluble polymer defined by claim 1 wherein the copolymerized monomers consist of 60 percent by weight acrylamide and 40 percent by weight tertiary butyl acrylamide.

4. A water-soluble polymer defined by claim 1 wherein the copolymerized monomers consist of 65 percent by weight acrylamide and 35 percent by weight butyl acrylate.

5. A water-soluble polymer defined by claim 1 wherein the copolymerized monomers consist of 65 percent by weight acrylamide and 35 percent by weight tertiary octyl acrylamide.

6. A water-soluble polymer defined by claim 1 wherein the copolymerized monomers consist of 40 percent by weight acrylamide and 60 percent by weight isobutoxymethyl acrylamide.

7. A water-soluble polymer defined by claim 1 wherein the copolymerized monomers consist of 65 percent by weight acrylamide and 35 percent by weight methyl methacrylate.

* * * * *